(12) United States Patent
Richardson et al.

(10) Patent No.: US 8,010,487 B2
(45) Date of Patent: Aug. 30, 2011

(54) SYNCHRONIZATION AND COLLABORATION WITHIN PEER-TO-PEER AND CLIENT/SERVER ENVIRONMENTS

(75) Inventors: Ransom Lloyd Richardson, Beverly, MA (US); Edward J Fischer, Cambridge, MA (US); Dana Zircher, Woburn, MA (US); Christopher Norman, Princeton, MA (US); Hugh Francis Pyle, Salem, MA (US); Michael Andrew Jeffers, Boston, MA (US); Robert Sean Slapikoff, Chelmsford, MA (US)

(73) Assignee: Microsoft Corporation, Redmond, WA (US)

( * ) Notice: Subject to any disclaimer, the term of this patent is extended or adjusted under 35 U.S.C. 154(b) by 495 days.

(21) Appl. No.: 12/147,862

(22) Filed: Jun. 27, 2008

(65) Prior Publication Data

US 2009/0327302 A1 Dec. 31, 2009

(51) Int. Cl.
*G06F 17/30* (2006.01)
(52) U.S. Cl. ......... 707/622; 707/623; 709/227; 709/248
(58) Field of Classification Search .................. 709/227, 709/248; 707/999.203, 622, 623, 999.201
See application file for complete search history.

(56) References Cited

U.S. PATENT DOCUMENTS

| | | | | |
|---|---|---|---|---|
| 6,397,125 | B1 * | 5/2002 | Goldring et al. | 700/200 |
| 6,564,246 | B1 * | 5/2003 | Varma et al. | 709/205 |
| 6,598,059 | B1 | 7/2003 | Vasudevan | |
| 6,662,212 | B1 * | 12/2003 | Chandhok et al. | 709/206 |
| 6,678,882 | B1 * | 1/2004 | Hurley et al. | 717/121 |
| 6,809,738 | B2 * | 10/2004 | Hubrecht et al. | 345/543 |
| 6,868,425 | B1 | 3/2005 | Bergstraesser | |
| 7,032,033 | B1 * | 4/2006 | Ledoux et al. | 709/248 |
| 7,146,399 | B2 * | 12/2006 | Fox et al. | 709/203 |
| 7,152,076 | B2 * | 12/2006 | Sundararajan et al. | 1/1 |
| 7,225,231 | B2 * | 5/2007 | Mendez et al. | 709/206 |
| 7,251,669 | B1 | 7/2007 | Arora | |
| 7,564,874 | B2 * | 7/2009 | King | 370/503 |
| 7,720,884 | B1 * | 5/2010 | Gandhi et al. | 707/804 |
| 7,725,669 | B1 * | 5/2010 | Bingham et al. | 711/162 |
| 7,734,828 | B2 * | 6/2010 | Prasad | 709/248 |
| 2002/0169745 | A1 * | 11/2002 | Hotti et al. | 707/1 |
| 2003/0130984 | A1 * | 7/2003 | Quinlan et al. | 707/1 |
| 2004/0117666 | A1 | 6/2004 | Lavender | |
| 2004/0128354 | A1 * | 7/2004 | Horikiri et al. | 709/204 |
| 2004/0193952 | A1 * | 9/2004 | Narayanan et al. | 714/13 |

(Continued)

OTHER PUBLICATIONS

Chou, "Get into the Groove: solutions for secure and dynamic collaboration", TechNet Magazine Jan. 2007, pp. 58-63.*

(Continued)

*Primary Examiner* — Hung T Vy
*Assistant Examiner* — Phuong-Thao Cao
(74) *Attorney, Agent, or Firm* — Hope Baldauff Hartman, LLC (57) ABSTRACT

Tools and techniques are described for synchronization and collaboration within peer-to-peer and client/server environments. These tools may provide methods that include establishing peer-to-peer relationships between two or more client systems. These relationships enable the client systems to create respective local instances of workspaces, shared between the client systems to allow them to collaborate with one another. The client systems may participate in peer-to-peer synchronization flows with one another, with the synchronization flows representing updates made local to the shared workspaces of the client systems. The methods may also establish establishing a client/server relationship between one of the client systems and a server system. Through this client/server relationship, the client and server systems may participate in client/server synchronization flows, with these flows representing updates made to the local shared workspace at the client system.

20 Claims, 9 Drawing Sheets

U.S. PATENT DOCUMENTS

| | | | |
|---|---|---|---|
| 2005/0044530 A1 | 2/2005 | Novik | |
| 2005/0091233 A1* | 4/2005 | Friske et al. | 707/100 |
| 2005/0193024 A1* | 9/2005 | Beyer et al. | 707/200 |
| 2005/0198074 A1* | 9/2005 | Khayter et al. | 707/104.1 |
| 2005/0251523 A1* | 11/2005 | Rajamani et al. | 707/100 |
| 2006/0085380 A1* | 4/2006 | Cote et al. | 707/1 |
| 2006/0101064 A1* | 5/2006 | Strong et al. | 707/102 |
| 2006/0155716 A1* | 7/2006 | Vasishth et al. | 707/100 |
| 2006/0277224 A1* | 12/2006 | Aftab et al. | 707/201 |
| 2007/0019683 A1* | 1/2007 | Kryzyanowski | 370/503 |
| 2007/0088707 A1* | 4/2007 | Durgin et al. | 707/10 |
| 2007/0136325 A1* | 6/2007 | Chan et al. | 707/100 |
| 2007/0186157 A1* | 8/2007 | Walker et al. | 715/530 |
| 2007/0198744 A1* | 8/2007 | Wensley et al. | 709/248 |
| 2007/0219826 A1* | 9/2007 | Brodsky et al. | 705/2 |
| 2007/0255787 A1* | 11/2007 | Richardson et al. | 709/204 |
| 2007/0276836 A1* | 11/2007 | Chatterjee et al. | 707/10 |
| 2008/0028000 A1 | 1/2008 | Makismenka | |
| 2008/0034012 A1 | 2/2008 | Novik | |
| 2008/0077632 A1* | 3/2008 | Tysowski et al. | 707/204 |
| 2008/0098042 A1* | 4/2008 | Tian et al. | 707/201 |
| 2008/0165807 A1* | 7/2008 | Nilo et al. | 370/503 |
| 2009/0240726 A1* | 9/2009 | Carter et al. | 707/103 R |

OTHER PUBLICATIONS

Microsoft Office Groove 2007 Product Guide, Sep. 2006, pp. 1-31.*
Castro et al., IEEE Computer Society, Proceedings of the Sixth IEEE Workshop on Mobile Computing Systems and Applications entitled, "A Programming Framework for Mobilizing Enterprise Applications," dated 2004; 10 pgs.
Website article entitled, "Introduction to the Microsoft Sync Framework Runtime," dated Nov. 2007; 12 pgs.
Website article entitled, "Microsoft Launches Sync Framework," downloaded Jun. 2008; 6 pgs.
Website article entitled, "Get into the Groove: Solutions for Secure and Dynamic Collaboration," downloaded Jun., 2008; 6 pgs.

* cited by examiner

SYNCHRONIZATION AND COLLABORATION WITHIN PEER-TO-PEER AND CLIENT/SERVER ENVIRONMENTS

BACKGROUND

Collaboration tools may operate on a peer-to-peer model, in which two or more client or peer systems establish peer-to-peer relationships, by which their respective users may collaborate or cooperate on some particular project of interest. As changes or revisions occur on the different peer systems, the collaboration tools may sync or propagate these changes to the other peer systems. Groups of these peer systems may be configured so that no single peer serves as a single central coordination point. Such groups of peer systems may be characterized as "distributed" systems or "multi-master" systems.

Collaboration tools may operate on a client-server model, in which certain functions are allocated to the server and other functions are permitted to the client. In cases where the client goes off-line, the client may be able to perform some limited functionality. When the client returns online, the client and server may sync any changes with one another. In some cases, multiple different clients may communicate with the server in a hub-spoke topology.

SUMMARY

Tools and techniques are described for synchronization and collaboration within peer-to-peer and client/server environments. These tools may provide methods that include establishing peer-to-peer relationships between two or more client systems. These relationships enable the client systems to create respective local instances of data, shared between the client systems to allow them to collaborate with one another. The client systems may participate in peer-to-peer synchronization flows with one another, with the synchronization flows representing updates made locally to the data shared between the client systems. The methods may also establish establishing a client/server relationship between one or more of the client systems and a server system. Through this client/server relationship, the client and server systems may participate in client/server synchronization flows, with these flows representing updates made to the local shared data at the client system, or updates made at the server system.

The above-described subject matter may also be implemented as a method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for enhanced synchronization and collaboration within peer-to-peer and client/server environments. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of tools and techniques for synchronization and collaboration within peer-to-peer and client/server environments will be described.

Figure 1:
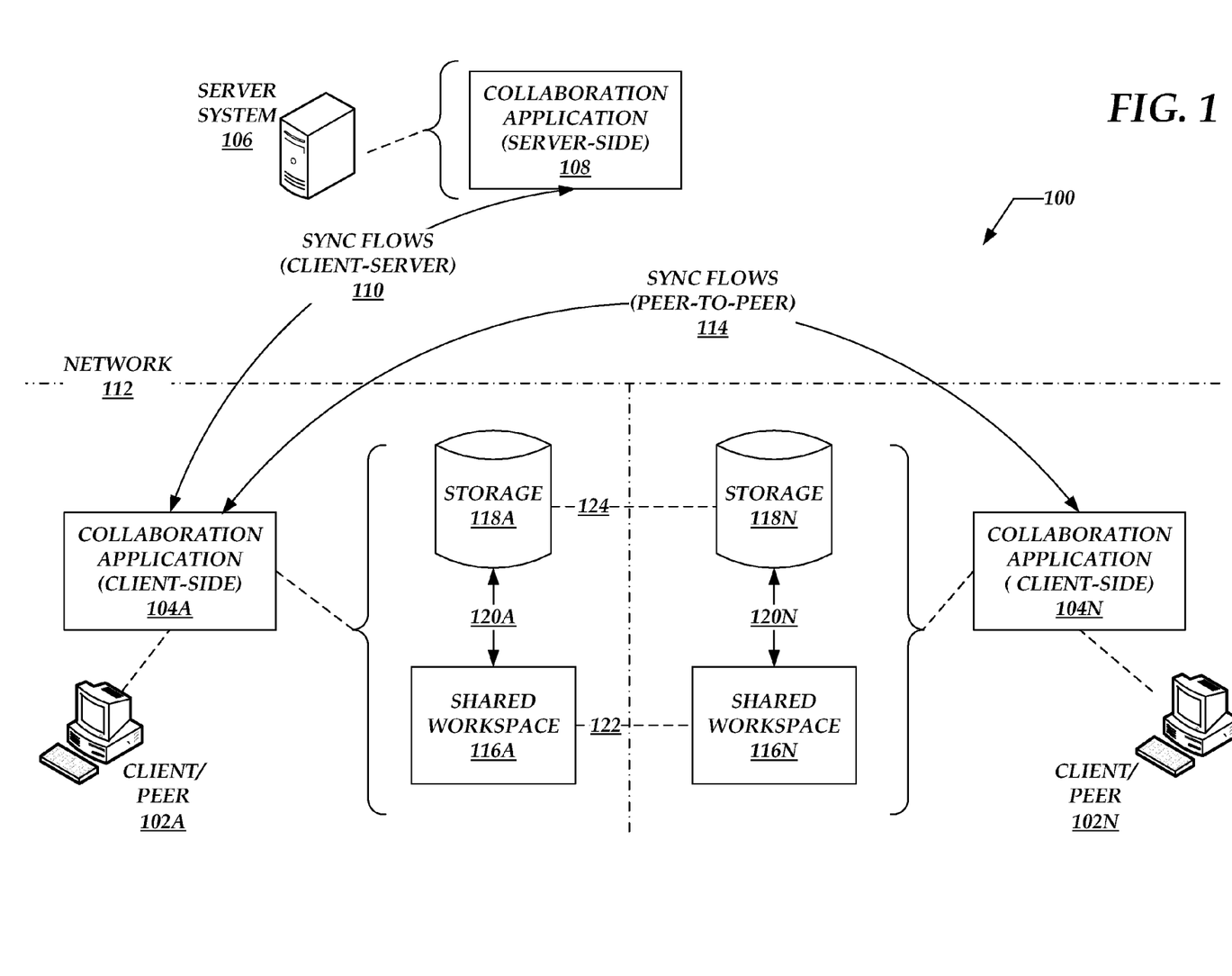
FIG. 1 is a combined block and flow diagram illustrating systems or operating environments for synchronization and collaboration within peer-to-peer and client/server environments.

FIG. 1 illustrates systems or operating environments, denoted generally at 100, for synchronization and collaboration within peer-to-peer and client/server environments. These systems 100 may include one or more client or peer systems 102, with FIG. 1 illustrating two examples of such systems, denoted at 102*a* and 102*n* (collectively, client systems 102). As detailed further below, this description may refer to these systems 102 as client systems, peer systems, or member systems, depending on the context of the description, and depending on the other systems with which these systems 102 are interacting at a given time. Implementations of the description herein may include any number of client systems 102, with FIG. 1 showing two examples only to facilitate this description.

Turning to the client systems 102 in more detail, the client systems 102 may contain respective instances of a collaboration application, as denoted at 104a and 104n (collectively, collaboration application 104). In some instances, these collaboration applications may enable one or more given client systems 102 to interact with one or more external server systems 106. In such instances, the server systems 106 and the given client systems 102 may have a client/server relationship, and the collaboration applications 104 may serve as client-side collaboration applications. Accordingly, the server system 106 may include a server-side collaboration application 108, which is adapted to cooperate with the client-side collaboration applications 104 to exchange synchronization flows 110 between the client and server systems.

Subsequent drawings and related description elaborate further on these client/server synchronization flows 110. However, in overview, the collaboration applications 104 and 108 may enable one or more users (not shown) accessing the client systems 102 to synchronize various data to and/or from the server systems 106. More specifically, the client systems 102 and the server systems 106 may communicate over one or more intermediate communications networks 112. These networks 112 generally represent any protocols, adapters, components, and other general infrastructure associated with wired and/or wireless communications networks. Such networks 112 may be global, regional, local, and/or personal in scope and nature, as appropriate in different implementations.

In some cases, two or more of the systems (e.g., 102a and 102n) may simultaneously be in a peer-to-peer relationship with one another, while also being in a client/server relationship with the server systems 106. In such instances, these systems 102 may be characterized as peer systems, vis-à-vis one another. As such, the client-side collaboration components may enable the peer systems 102 to exchange peer-to-peer synchronization flows 114 with one another.

Subsequent drawings and related description elaborate further on these peer-to-peer synchronization flows 114. In overview, the client-side collaboration applications 104 may enable the users accessing the client systems 102 to collaborate with other users accessing similarly-configured client systems 102. In some cases, the client systems 102 may communicate with one another over the network 112, or other similar networks.

Turning to the client/peer systems 102 in more detail, the collaboration applications 104 may implement and maintain a shared workspace, through which the client systems 102 collaborate with one another. For example, respective users associated with the client systems 102a and 102n may collaborate with one another while working on a given project in a corporate enterprise. To facilitate this cooperation between the users, the collaboration applications 104 may maintain local instances of the shared workspace, as denoted respectively at 116a and 116n (collectively, shared workspace 116). In addition, the collaboration applications 104 may maintain respective instances of storage elements, as denoted respectively at 118a and 118n (collectively, storage elements 118).

In general, the storage elements 118 may contain any databases, data structures, schemas, or other data elements as appropriate for implementing the shared workspace 116 through which the client systems collaborate. Data and/or process flows between local instances of the shared workspaces 116 and the local storage elements 118 are represented at 120a and 120n, respectively on the client systems 102a and 102n.

Although the client systems 102 maintain respective local instances of the shared workspaces 116 and storage elements 118, the peer-to-peer flows 114 enable these local instances of the shared workspaces 116 and storage elements 118 to be synchronized with one another. More specifically, actions performed locally at the client system 102a may be synchronized over to the client system 102n, and vice versa.

Over time, the peer-to-peer synchronization flows 114 cause the shared workspaces 116a and 116n to mirror one another, as represented by dashed line 122 in FIG. 1. Similarly, the peer-to-peer synchronization flows 114 also cause the storage elements 118a and 118n to mirror one another, as represented by a dashed line 124 and FIG. 1.

Having described the operating environments 100 in FIG. 1 for synchronization and collaboration within peer-to-peer and client/server environments, the discussion now turns to a more detailed description of architectural components within the client/peer systems 102 and the server systems 106. This description is now provided with FIG. 2.

Figure 2:
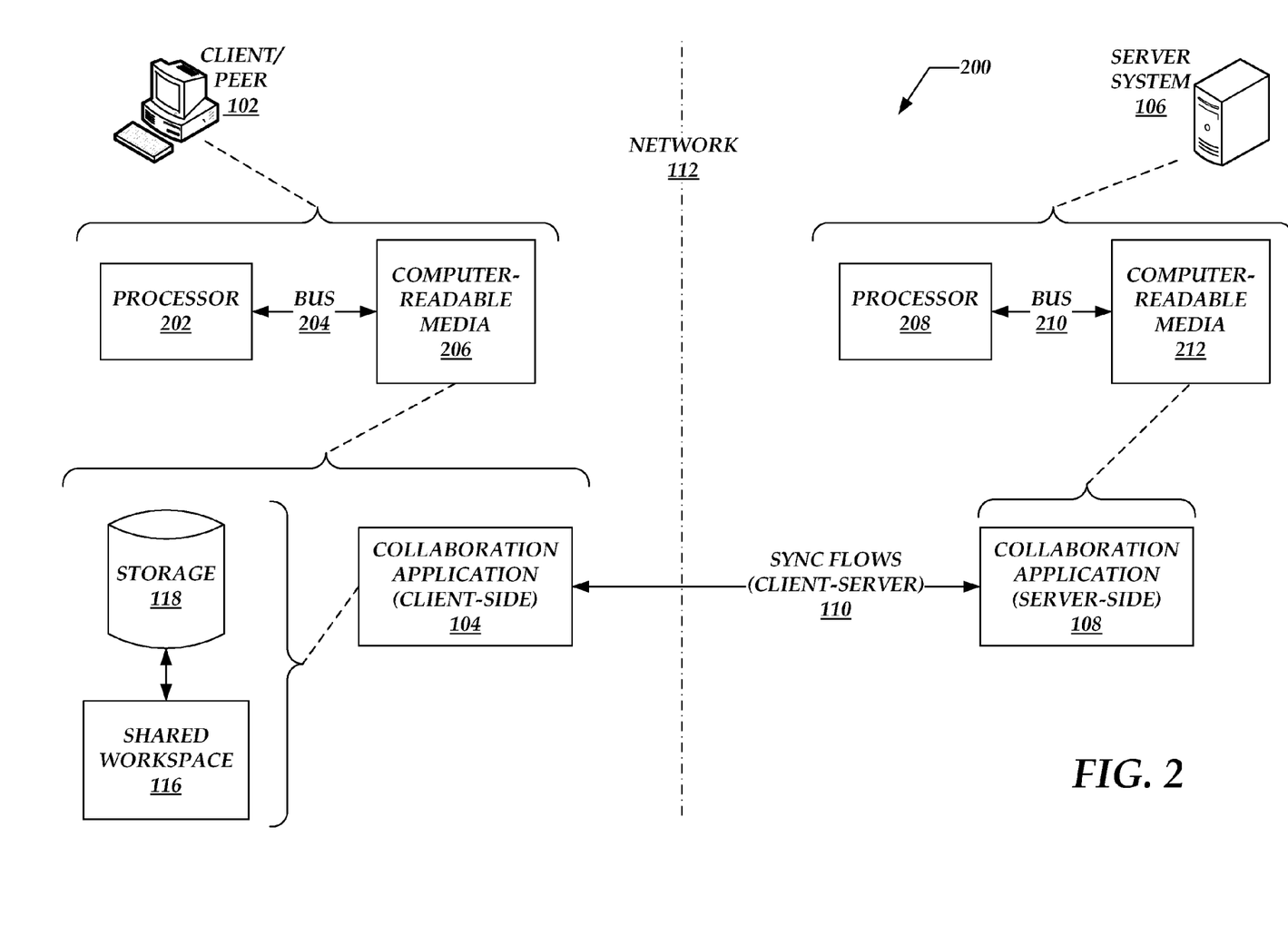
FIG. 2 is a combined block and flow diagram illustrating additional aspects of the client systems and server systems as shown in FIG. 1.

FIG. 2 illustrates additional aspects, denoted generally at 200, of the client systems and server systems as shown in FIG. 1. For convenience of description, but not to limit possible implementations, FIG. 2 may carry forward some elements from previous drawings, and denote them with identical reference numbers. For example, FIG. 2 carries forward an example client system 102 that may communicate with an example server system 106 over a network 112.

Turning to the client systems 102 in more detail, these may include one or more processors 202, which may have a particular type or architecture, chosen as appropriate for particular implementations. The processors 202 may couple to one or more bus systems 204 chosen for compatibility with the processors 202.

The client systems 102 may also include one or more instances of computer-readable storage media 206, which couple to the bus systems 204. The bus systems may enable the processors 202 to read code and/or data to and/or from the computer-readable storage media 206. The media 206 may represent storage elements implemented using any suitable technology, including but not limited to semiconductors, magnetic materials, optics, or the like. The media 206 may include memory components, whether classified as RAM, ROM, flash, or other types, and may also represent hard disk drives.

The storage media 206 may include one or more data structures and modules of instructions that, when loaded into the processor 202 and executed, cause the client systems 102 to perform various tools and techniques relating to synchronization and collaboration within peer-to-peer in client/server environments. Examples of these modules may include a client-side collaboration application, carried forward at 104. The collaboration application may enable two or more of the client systems 102 to establish and maintain the shared workspace 116. As detailed further throughout this description, the shared workspace 116 may enable different users to collaboratively access and edit a variety of different shared folders, documents, objects, and the like. For example, the storage elements, carried forward at 118, may store or contain representations of such folders, documents, objects, and the like.

Turning now to the server systems 116 in more detail, these server systems may include one or more processors 208, which may have a particular type or architecture, chosen as appropriate for particular implementations. The processors 208 in the server systems 106 may or may not have the same type and/or architecture as the processors 202 in the client systems 102. The processors 208 may couple to one or more bus systems 210 chosen for compatibility with the processors 208.

The server systems 106 may also include one or more instances of computer-readable storage media 212, which couple to the bus systems 210. The bus systems may enable the processors 208 to read code and/or data to and/or from the computer-readable storage media 212. The media 212 may represent storage elements implemented using any suitable technology, including but not limited to semiconductors, magnetic materials, optics, or the like. The media 212 may include memory components, whether classified as RAM, ROM, flash, or other types, and may also represent hard disk drives.

The storage media 212 may include one or more data structures and modules of instructions that, when loaded into the processor 208 and executed, cause the server systems 106 to perform various tools and techniques relating to synchronization and collaboration within peer-to-peer in client/server environments. For example, these modules may provide one or more instances of server-side collaboration applications, carried forward at 108. As detailed further below, the client-side and server-side collaboration applications (104 and 106, respectively) may cooperate to exchange the client server synchronization flows 110 between the client systems 102 and the server systems 106.

In some cases, the server system 106 may assume the role of a client or peer system, along with one or more of the client systems 102. In other cases, the server system may perform specialized functions not otherwise performed by the client systems 102. For example, the server system 106 may provide backup, administrative, managerial, or other services on behalf of the client systems 102, in connection with facilitating collaboration between the client systems 102, as well as between the client systems 102 and the server systems 106.

As can be appreciated from FIGS. 1 and 2, the systems or operating environments shown therein may facilitate both client/server interactions and peer-to-peer interactions. The discussion now proceeds to FIG. 3 to provide additional description of these client/server and peer-to-peer interactions, as facilitated by the collaboration applications.

Figure 3:
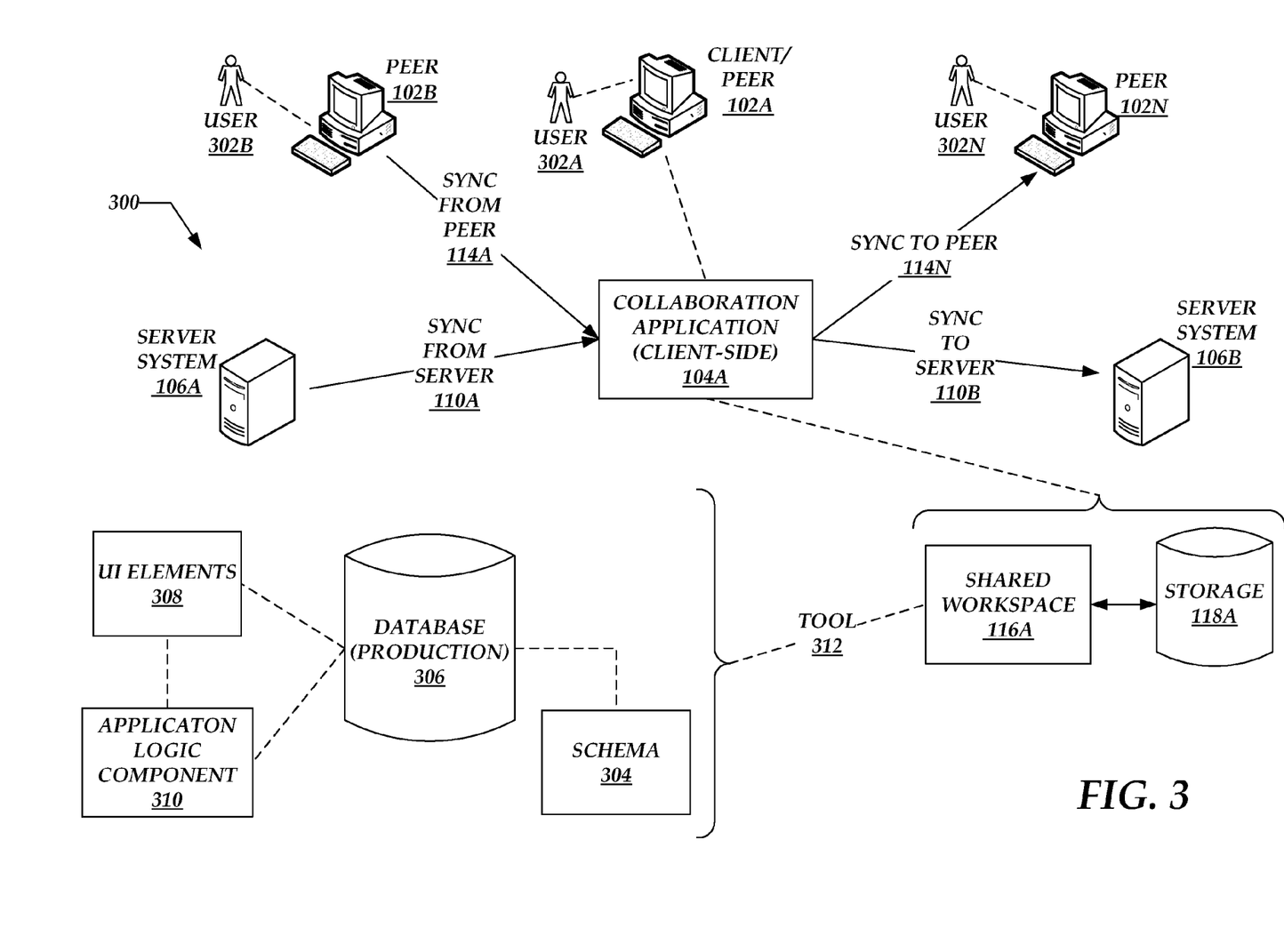
FIG. 3 is a combined block and flow diagram illustrating components and data flows by which a given client system may exchange peer-to-peer synchronization flows with any number of other client systems, as well as participating in client/server synchronization flows involving any number of server systems.

FIG. 3 illustrates components and data flows, denoted generally at 300, by which a given client system may exchange peer-to-peer synchronization flows with any number of other client systems, as well as participating in client/server synchronization flows involving any number of server systems. For convenience of description, but not to limit possible implementations, FIG. 3 may carry forward some elements from previous drawings, and denote them with identical reference numbers. For example, FIG. 3 carries forward an example client-side collaboration application at 104, as contained within an example client or peer system 102a.

Turning to the client or peer system 102a, the collaboration application 104a running thereon may manage and maintain local instances of the shared workspace 116a and related storage elements 118a. more specifically, a user 302a associated with the client system 102a may wish to collaborate on a given project with other users 302b and 302n, who are associated respectively with the peer systems 102b and 102n. Accordingly, the user 302a may issue commands to the collaboration application 104a to issue invitations to the peer systems 102b and 102n, thereby inviting the users 302b and 302n to collaborate with the user 302a. assuming that the user 302b and/or the user 302n accepts these invitations, the peer system 102a may instantiate the shared workspace 116a and storage elements 118a, while the peer systems 102b and 102n instantiate corresponding shared workspaces and storage elements (not shown in FIG. 3, but illustrated in FIG. 1).

Having established peer-to-peer synchronization relationships among the peer systems 102a-102n, the client-side collaboration components 104 operating respectively on these peer systems may synchronize changes made on any of these peer systems. For example, if the user 302b makes a change or revision locally at the peer system 102b, this change may be synced to the peer system 102a, as represented at 114a. In turn, the peer system 102a may forward this change or revision to the peer system 102n, as represented at 114n. In general, peer-to-peer synchronization flows may occur at any suitable direction between the peer systems 102a-102n.

Assume, for example, that the users 302a-302n (collectively, users 302) are collaborating on a project that involves maintenance of an address book, contact list, or other similar data structure (referred to collectively as the "contact list"), to be distributed among the client systems 102a-102n. In this example, one of the peer systems (e.g., the peer system 102a) may download a set of data structures or other elements from an external server system (e.g., 106a), as represented generally at 110a. For example, the server system 106a may sync to the client system 102a a schema 304 for building a production database 306 suitable for housing the address book, contact list, or data structure collaboratively maintained and revised by the peer systems 102a-102n. In addition, the production database 306 may populate a set of user interface (UI) elements 308, with which the users 302 may interact when issuing commands related to accessing or revising the contact list.

The client-side collaboration application 104a may instantiate one or more application logic components 310 that are operative to access or revise a contact list, in response to user input. The application logic components 310 may be incorporated into tools 312, along with data within the database 306, the schema 304, and related UI elements 308. The application logic components 310 may include logic for transforming and validating data, as described in further detail below. In some instances, the application logic components 310 may include descriptions of business logic (e.g., advanced validation, workflow behavior based on actions taken at clients, and the like) that may transported from the server to groups of peer systems.

Taken collectively, the production database 304, the related schema 304, the UI elements 308, and the application logic components 310 may operate through the workspaces 116 shared across the client systems 102. Having introduced these items in FIG. 3, the discussion now turns to a more detailed description of these items, now presented with FIG. 4.

Figure 4:
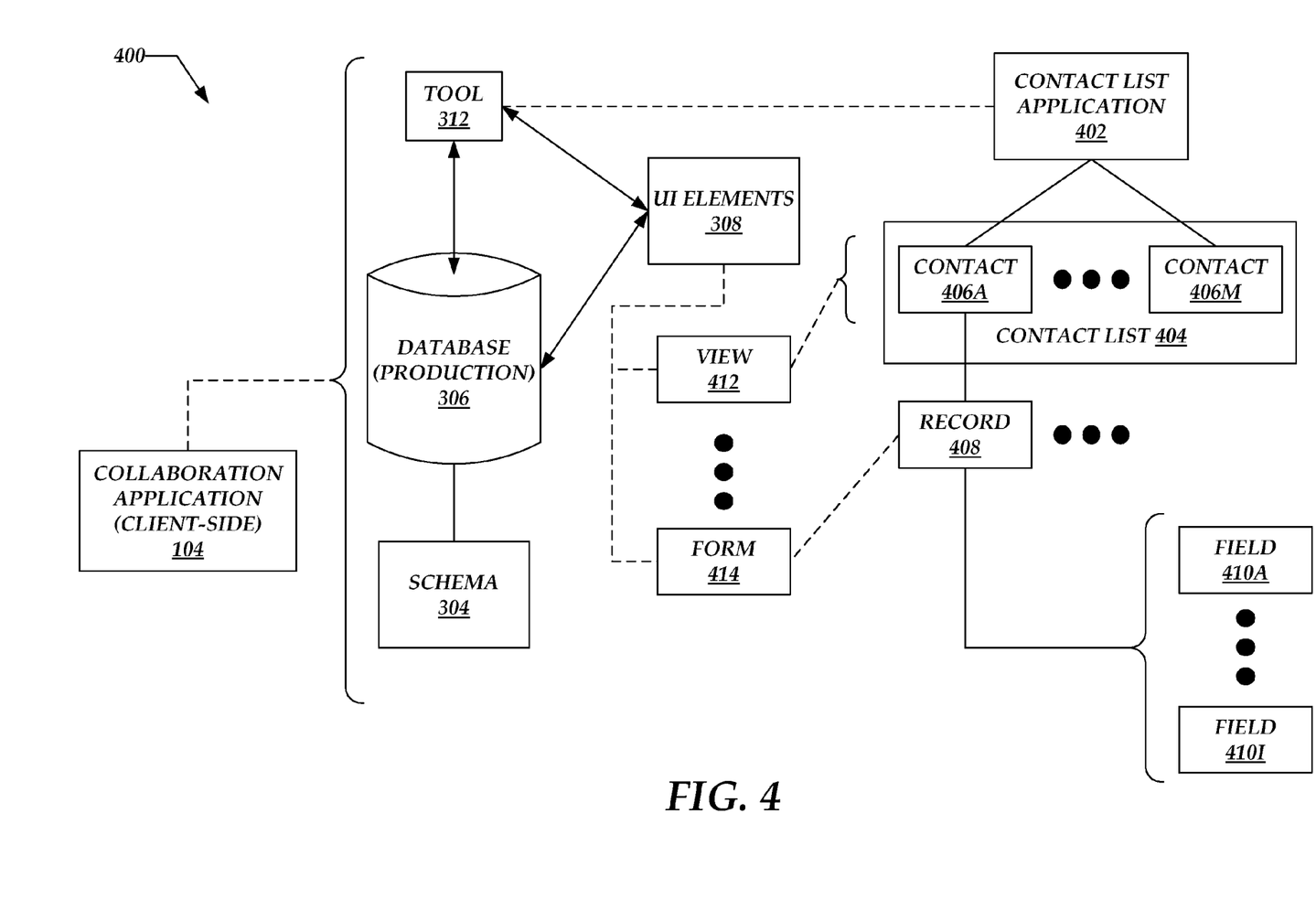
FIG. 4 is a block diagram illustrating additional aspects of a production database and related schema, UI elements, and tools as provided by a client-side collaboration application, as shown in FIG. 3.

FIG. 4 illustrates additional aspects, denoted generally at 400, of the production database 306, related schema 304, UI elements 308, and tools 310 as provided by the client-side collaboration application 104, as shown in FIG. 3. While this discussion is presented in connection with the example involving a contact list, it is noted that this example is provided only to facilitate the present description, but not to limit possible implementations.

Turning to the tool 312 in more detail, in the contact list example, the tool may take the form of an application 402 through which users (e.g., 302 in FIG. 3) may manage the contact list, represented generally at 404. The contact list 404 may include any number of individual contacts 406a and 406m (collectively, contacts 406). For example, if the contact list 404 contains contact information for a plurality of persons, different contacts 406 may represent or correspond to individual persons.

Individual contacts 406 may be implemented by corresponding record structures 408, which may contain any number of fields 410a and 410i (collectively, fields 410). For example, assuming that the contact list 404 stores names, addresses, telephone numbers, or similar information for the individual contacts 406, a respective record structure 408 may be with the individual contacts 406. In turn, this record structure 408 may contain individual fields 410 that store representations of the names, addresses, telephone numbers, and the like.

Turning to the UI elements 308 in more detail, these UI elements may define representations of views 412. These views 412 may provide different types of representations, depending on the nature of the underlying data. For example, these views 412 may present lists of data elements, views of calendar data, Gantt charts or other representations of tasks within ongoing projects, or the like.

These views 412 may display to the users representations of at least a portion or a subset of the contact list 404, along with representations of at least some of the individual contacts 406. For example, individual contacts may be associated with one another by relationship, authorship, location, or other factors. In some cases, the view may select different records, according to which user is requesting the view, in scenarios in which the same device may support multiple users. In addition, the representations of the individual contacts may be responsive to user activation, selection, or input, causing the UI elements 308 to present one or more forms 414 dedicated to the individual selected contact. For example, a given form 414 may present information from the fields 410a-410i that are associated with the record 408.

In this manner, the UI elements 308 may enable users to visualize names, addresses, telephone numbers, and the like is associated with particular contacts 406. In addition, as described in further detail below, the collaboration application 104 may enable the users to create new contacts 406, add new fields 410 to contact records 408, change the contents of existing fields, and the like.

Turning to the schema 304 and the production database 306 in more detail, the schema 304 may specify the data structure or hierarchy that governs the construction of the contact list 404. For example, the schema 304 may specify the fields 410 available for inclusion within records 408 that are instantiated for the individual contacts 406. In addition, the production database 304 may populate the list views 412 and the forms 414 presented as part of the UI elements 308.

Referring briefly back to FIG. 3, the schema 304, the production database 306, and the tools 310 are synced from the server system 106a to the client system 102a. However, the client system 102a or any other client system 102 may just as readily invoke a designer application locally on the client system, and construct at least portions of the schema, production database, and tools. Afterwards, any of the client systems (e.g., 102a) may sync any updated or created schemas, production databases, and/or tools to a server system 106b, as represented generally at 110b. The server system 106b may or may not be the same as the server 106a.

In some implementations, the tools 310 may operate in at least two illustrative, separate modes. In a "connected" mode, design elements within the client systems are slaved to the server, and no design changes are made at the client. In connected mode, only data changes are made at the client. In a "not connected" mode, the clients are not connected to a server system, and design changes can be made by any authorized peer member of the workspace. These design changes are then synchronized to other peers within the workspace.

Having described the components and data flows shown in FIG. 4, the discussion now turns to a more detailed description of process flows related to instantiating and syncing tools or applications. This description is now provided with FIG. 5.

Figure 5:
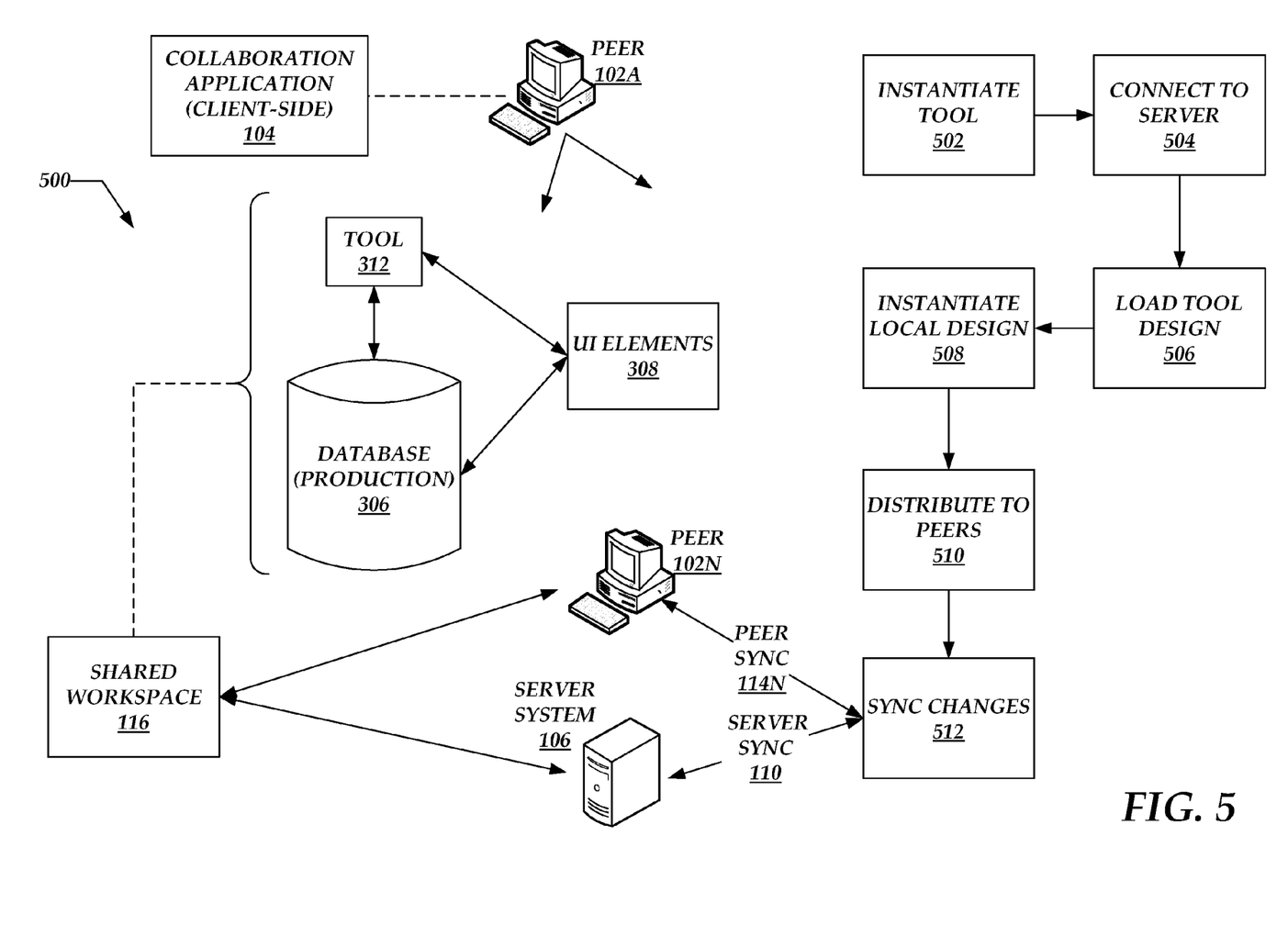
FIG. 5 illustrates process flows, denoted generally at 500, related to instantiating in syncing tools and applications, such as those discussed in connection with FIGS. 3 and 4.

FIG. 5 illustrates process flows, denoted generally at 500, related to instantiating in syncing tools and applications, such as those discussed in connection with FIGS. 3 and 4. For convenience of description, but not to limit possible implementations, FIG. 5 may carry forward some elements from previous drawings, and denote them with identical reference numbers. For example, FIG. 5 carries forward an example peer system at 102a, which for the purposes of this description may perform the process flows 500.

Turning to the process flows 500 in more detail, block 502 represents instantiating a tool or application on the peer system 102a. FIG. 5 carries forward an example of such a tool or application at 310.

Block 504 represents connecting the peer system 102a to a server system (e.g., 102a in FIG. 3). More specifically, block 504 may include connecting to the server system to download or sync parameters relating to a design of the tool or application 312. For example, block 504 may include downloading a schema suitable for constructing a production database (e.g., 306), as well as populating UI elements (e.g., 308).

Block 506 represents loading or syncing a design for the tool or application, having connected to the server in block 504. In turn, block 508 represents instantiating a tool or application design locally at the peer system 102a. More specifically, block 508 may include instantiating the production database 306, UI elements 308, and tool or application 312 as shown in FIG. 5.

Block 510 represents distributing the tool or application design, as instantiated in block 508, to one or more other peer systems. For example, assuming that the peer systems 102a and 102n as shown in FIG. 5 are collaborating through shared workspaces 116 (shown in previous drawings), block 510 may include syncing the instantiated tool or application design to these other peer systems 102n.

Block 512 represents syncing changes between any number of peer systems, with these changes made using the tool or application instantiated and distributed in blocks 508 and 510. For example, FIG. 5 carries forward an example of a sync between two or more peers at 114n.

In some scenarios, block 512 may include syncing the instantiated tool or application to one or more server systems (e.g., carried forward at 106). FIG. 5 denotes an example syncing to and/or from a server at 110.

FIG. 5 illustrates example process flows 500 in which a tool or application is instantiated locally at a given peer system, based on a design synced from an external server. However, as described above, implementations are possible in which the tool or application is built locally at the peer system using a design provider or designer. These latter implementations may, for example, omit blocks 502-506.

Having described the process flows 500 and FIG. 5, the discussion now turns to a description of process flows by which peer systems may revise and synchronize revisions occurring locally on the peer systems. This description is now provided with FIG. 6.

Figure 6:
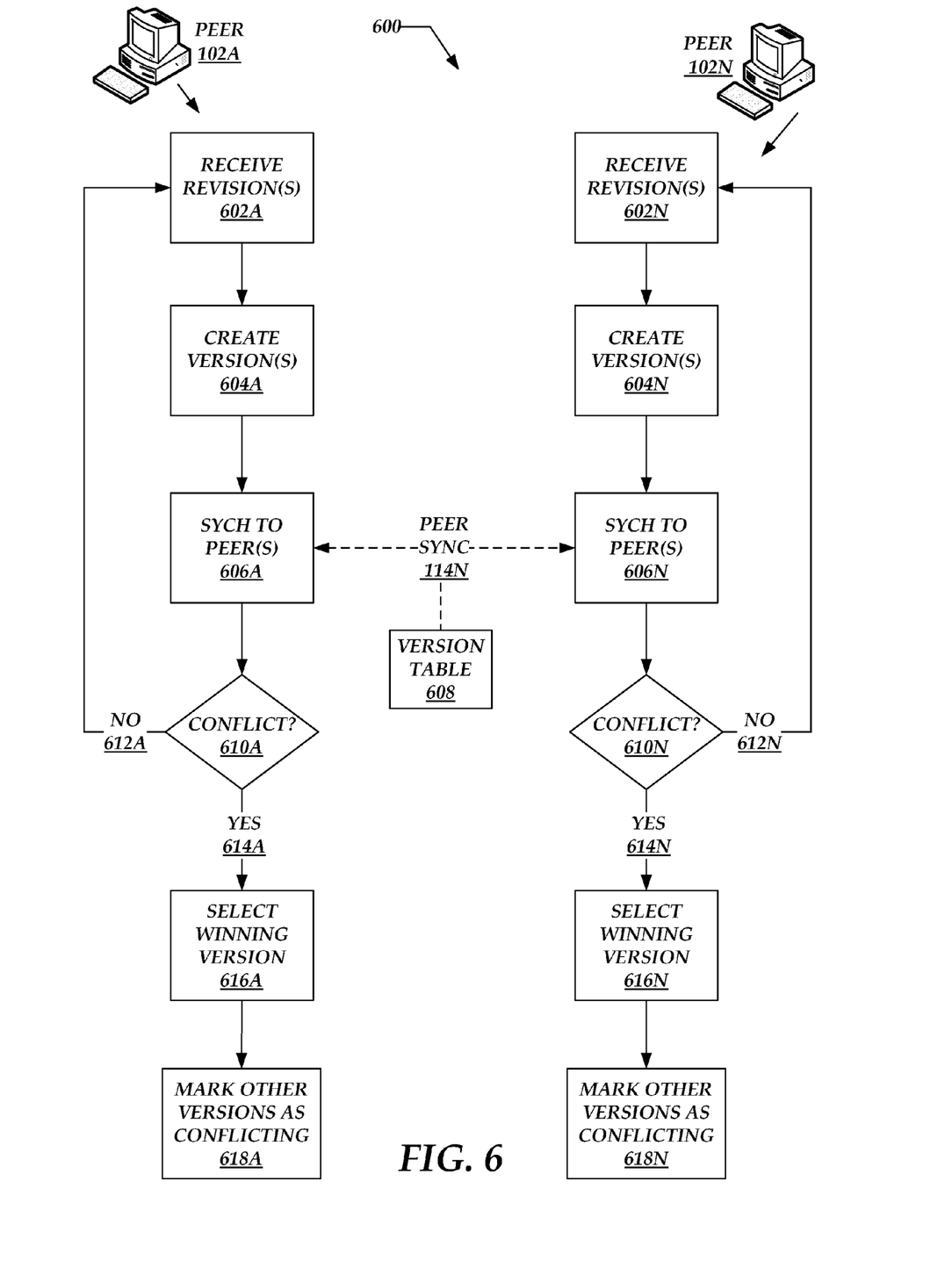
FIG. 6 is a combined block diagram and flow chart, illustrating components and process flows by which peer systems may revise and synchronize revisions occurring locally on the various peer systems.

FIG. 6 illustrates process flows, denoted generally at 600, by which peer systems may revise and synchronize revisions occurring locally on the various peer systems. For convenience of description, but not to limit possible implementations, FIG. 6 may carry forward some elements from previous drawings, and denote them with identical reference numbers. For example, FIG. 6 carries forward example peer systems at 102*a* and 102*n*, which are assumed to be collaborating through respective instances of a shared workspace 116.

Only for the purposes of this description, but not to limit possible implementations, the process flows 600 are illustrated and described in connection with the peer systems 102*a* and 102*n*. However, implementations of this description may perform at least portions of the process flows 600 using other components without departing from the scope and spirit of this description. In addition, these process flows are described as proceeding in certain orders only for purposes of this description, and implementations of these process flows may proceed in different orders as well.

Turning to the process flows 600 in more detail, block 602*a* represents receiving indications of one or more revisions occurring locally at the peer system 102*a*. At the peer system 102*n*, block 602*n* represents receiving indications of revisions occurring locally at that peer system. the revisions received in blocks 602*a* and 602*n* may, for example, made through the UI elements 308 shown in FIGS. 3 and 4, as facilitated by the tools or applications 310.

Referring back to the above example involving the contact list 404 shown in FIG. 4, the revisions received in blocks 602*a* and 602*n* may include revisions made to the record structures 408 and/or to the fields 410. For example, one peer system 102*a* may modify the schema 304 to add a new field 410 to the record structures 408, with this new field including e-mail addresses for the various contacts 406. Another peer system 102*n* may revise an existing form 414 to provide a new phone number for a contact 406.

The revisions represented in blocks 602*a* and 602*n* may or may not occur simultaneously. Further, these revisions may occur while one or more of the peer systems 102*a* or 102*n* are in off-line or online states.

Block 604*a* represents the peer system 102*a* creating a local version on the peer in response to the revisions received in block 602*a*. For example, assuming that the peer system 102*a* modified the schema 304 to add the new field for e-mail addresses, block 604*a* may include creating a new version of the schema 304 to incorporate this new e-mail address field.

At the peer system 102*n*, block 604*n* represents creating a version on this peer system in response to the revisions received in block 602*n*. For example, assuming that the peer system 102*n* provided a new phone number for one of the contacts in a contact list, block 604*n* may include creating a new version of the contact list incorporating the new phone number.

Block 606*a* represents the peer system 102*a* syncing at least the new version created in block 604*a* with one or more other peer systems sharing the workspace 116. For example, block 606*a* may represent the peer system 102*a* syncing the new e-mail address field to one or more other peer systems (e.g., 102*n*).

Block 606*n* represents the peer system 102*n* syncing at least the new version created in block 604*n* with one or more other peer systems sharing the workspace 116. For example, block 606*n* may represent the peer system 102*n* syncing the new phone number for the contact to one or more other peer systems (e.g., 102*a*).

FIG. 6 carries forward at 114*n* a representation of peer syncs between the peer systems 102*a* and 102*n*. As part of these peer syncs, the process flows 600 may exchange a version table 608 between the client systems participating in the sync. Continuing the ongoing example, one instance of the version table 608 may reflect the new e-mail address field passing from the peer system 102*a* to the peer system 102*n*. Similarly, another instance of the version table 608 may reflect the new phone number passing from the peer system 102*n* to the peer system 102*a*.

Block 610*a* represents the peer system 102*a* evaluating the revisions synced-in from the peer system 102*n* in block 606*a*, to determine whether these revisions conflict with any revisions performed locally on the peer system 102*a*. For example, if the peer system 102*n* syncs a new telephone number for a contact across to the peer system 102*a*, block 610*a* may include determining whether this new telephone number conflicts with any information maintained locally at the receiving peer system 102*a*.

Similarly, at the peer system 102*n*, block 610*n* represents evaluating the revisions synced-in from the peer system 102*a* in block 606*n*, to determine whether these revisions conflict with any revisions performed locally on the peer system 102*n*. For example, if the peer system 102*a* sinks a new e-mail address field across to the peer system 102*n*, block 610*n* may include determining whether this new e-mail address field conflicts with any information maintained locally at the peer system 102*n*.

From decision block 610*a*, if no conflict results from the revisions synced-in from another peer system, the process flows 600 may take No branch 612*a* to return to block 602*a*. In block 602*a*, the peer system 102*a* may await further revisions arriving locally from, for example, a local user accessing this peer system. Similarly, from decision block 610*n*, no conflict results from the revisions synced-and from another peer system, the process flows 600 may take No branch 612*n*, returning to block 602*n* to await further revisions locally at the peer system 102*n*.

The preceding discussion described scenarios in which no conflict results from peer to peer syncs. However, in some cases, conflicts can result when peers sync with one another. Returning, for example, to decision block 610*a*, assume that the new telephone numbers synced-in from the peer system 102*n* conflicts with telephone information revised locally at the peer system 102*a* in this case, the process flows 600 may take Yes branch 614*a* to block 616*a*.

Block 616*a* represents selecting a winning version, as between the conflicting versions maintained locally at the peer system 102*a* and the version as synced-in from the peer system 102*n*. Any number of different algorithms or techniques may be employed to select this winning version, and are not detailed further in this description. Block 616*a* may also include designating or marking a winning version as such.

Having designated a winning version in block 616*a*, block 618*a* represents marketing other conflicting versions as such. However, block 618*a* may include retaining or maintaining these conflicting versions, rather than deleting them. For example, block 618*a* may include presenting a conflict resolution UI to one or more users accessing the peer system 102*a*, with this conflict resolution UI including representations of the various conflicting versions, as well as designating which version was selected as the winner the conflict. In this manner, block 618*a* may enable the users to review the conflicting versions, and correct or resolve any conflicts as appropriate.

In similar fashion, at the peer system 102*n*, if block 610*n* determines that a conflict exists with a version as synced-in from the peer system 102*a*, the process flows 600 may take Yes branch 614*n* to block 616*n*. Block 616*n* may operate similarly to block 616*a*, in selecting a winning version, with the understanding that block 616*n* executes on the peer system 102*n*.

Block 618*n* represents marking and maintaining the conflicting versions, similarly to block 618*a*. In general, the description of block 618*a* may apply equally to block 618*n*.

Having described the process flows 600 for receiving and syncing revisions across different peer systems, as well as resolving conflicts between those revisions, the discussion now proceeds to a description of process flows for performing client/server syncs. This description is now provided with FIG. 7.

Figure 7:
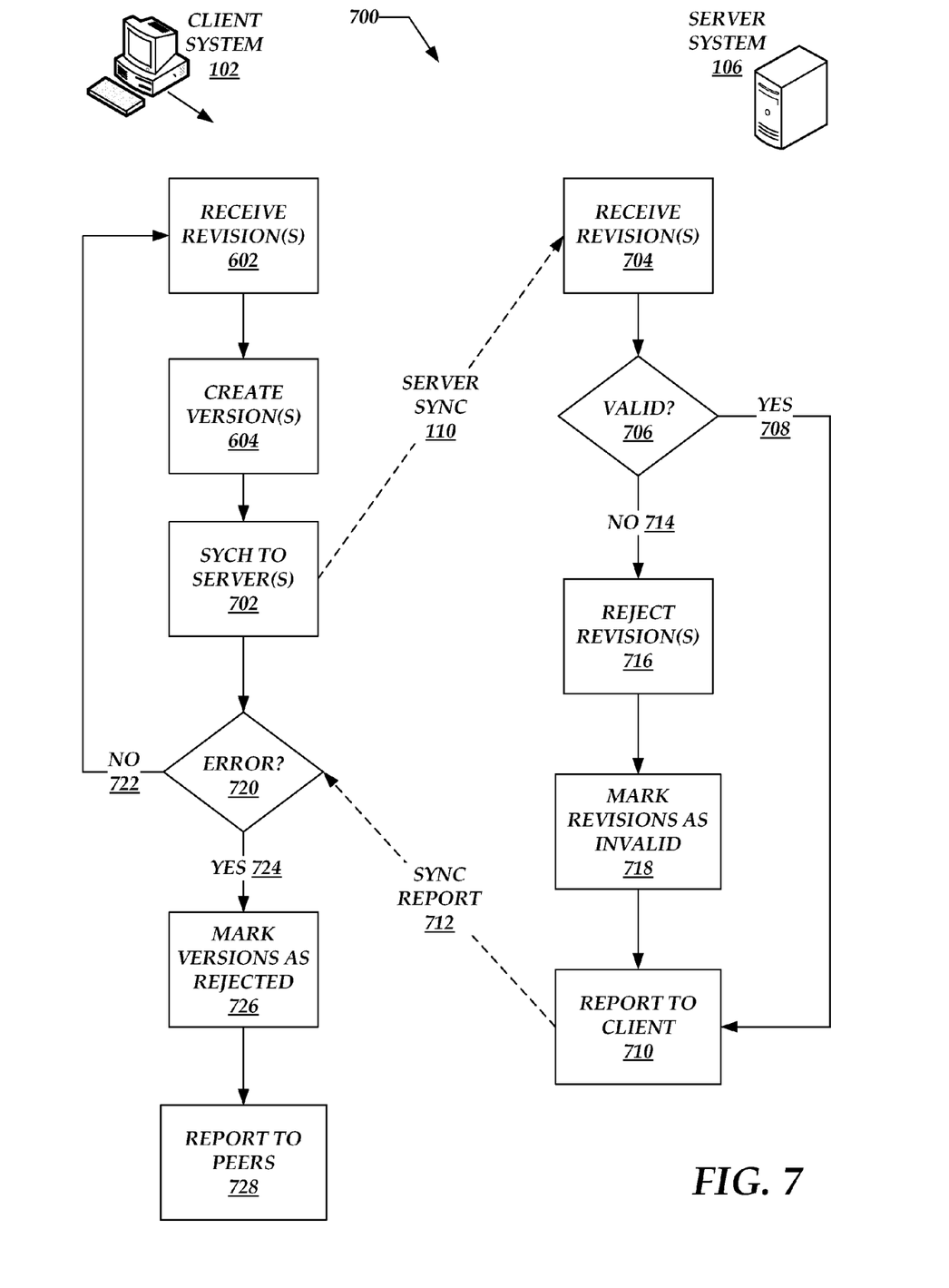
FIG. 7 is a flow chart illustrating processes for performing syncs between clients and servers.

FIG. 7 illustrates process flows, denoted generally at 700, for performing syncs between clients and servers. For convenience of description, but not to limit possible implementations, FIG. 7 may carry forward some elements from previous drawings, and denote them with identical reference numbers. For example, FIG. 7 carries forward an example client system 102, as well as a server system at 106. In addition, the process flows 700 shown in FIG. 7 may be understood as providing examples of the sync flows 110 between the client system 102 and a server system 106.

Turning to the process flows 700 in more detail, block 602 represents receiving any number of revisions locally at the client system 102. The processing represented in block 602 in FIG. 7 may be similar to that represented in blocks 602*a* and 602*n* in FIG. 7. Thus, the description of those blocks in FIG. 6 applies equally to block 602 in FIG. 7.

Block 604 represents creating versions on the client system 102 in response to the revisions received in block 602. In general, the processing represented in block 604 in FIG. 7 may be similar to that represented in block 604*a* and 604*n* in FIG. 6. Thus, the description of these blocks in FIG. 6 applies equally to block 604 in FIG. 7.

Block 702 represents syncing the version created in block 604 to one or more external server systems 106. FIG. 7 represents this client/server sync at 110, as carried forward from FIG. 1.

At the server system 106, block 704 represents receiving the sync from the client system 102. In turn, decision block 706 represents validating the sync received from the client system, to determine whether it is valid in the context of the server system 106.

From decision block 706, if the sync received from the client system is valid on the server system 106, the process flows 700 may take Yes branch 708 to block 710, which represents reporting this finding to the client system 102. More specifically, block 710 may include sending a synchronization report 712 to the client system, indicating the results of the server sync 110. If decision block 706 indicates that the data and/or items received sync are valid on the server system, the synchronization report 712 may so indicate.

Returning to decision block 706, if the sync received from the client system is invalid on the server system 106, the process flows 700 may take No branch 714 to block 716. Block 716 represents rejecting the revisions incorporated in the sync from the client system. For example, returning to the example in which one of the client systems 102 adds a new e-mail field to a database schema within the workspace 116, the server system 106 may determine that the client systems 112 lack sufficient permissions or privileges to alter the database schema, as stored on the server system 106. In another example pertaining to data changes, an application running on the server may determine that a value entered into an email address field for a particular contact is not valid, due to special rules or additional validation processing performed by this server-side application. However, a client-side version of this same application may not perform this same validation processing. In these or other example scenarios, block 716 may reject the attempted change to the server-side database schema.

Block 718 represents marking the rejected revisions as invalid. However, despite having found these revisions invalid, the server system 106 may maintain and retain the rejected revisions, rather than deleting these revisions. In this manner, the server system may avoid loss of the data changes made by users of the client systems. The process flows 700 may then proceed to block 710, to report the rejected revisions to the client system as part of the sync report 712.

At the client system 102, decision block 720 represents determining whether the server system reported an error in response to the server sync 110 initiated by the client system. For example, the sync report 712 may indicate errors arising on the server system. If the server system 106 did not report an error, the process flows 700 may take No branch 722 to return to block 602, and await further revisions at the client system 102.

Returning to decision block 720, if the server system 106 reported an error with the server sync 110, the process flows 700 may take Yes branch 724 to block 726, which represents marking the versions synced in block 702 as rejected by the server system. However, block 726 may include retaining or maintaining the rejected versions, rather than deleting them.

Block 728 represents reporting any error conditions to the client system 102, as well as any peer systems that are operating within a shared workspace with the client system 102. In this manner, the process flows 700 may enable appropriate ones of these peer systems to address or remediate any issues with the revisions that caused the server system rejecting the server sync 110.

Having described the process flows 600 and 700 in FIGS. 6 and 7, several observations are noted. First, FIG. 6 illustrates conflicts arising between peer systems 102, as well as managing and resolving those conflicts within the peer systems. Second, the scenario shown in FIG. 7, in which the server system 106 rejects syncs from the client systems may be referred to as "refuse errors". These refuse errors may be viewed as a type of conflict that arises between the server system 106 and any client systems 102. Generally, when conflicts arise between the server systems and client systems, the server systems may "win" these conflicts. However, the process flows 600 and 700 manage these different types of conflicts using similar mechanisms: by not only selecting a "winner" of the conflict in some manner, but also by preserving or maintaining the "losers" of the conflict. In this manner, the process flows at 600 and 700 enable further processing and resolution directed to the conflicting items that are not chosen as winners. These process flows 600 and 700 may also facilitate conversions between HTML and rich text, and the like.

Although the server systems and client systems may employ similar mechanisms to resolve conflicts, it is noted that the server systems may not be aware of all conflicts occurring among client systems that are operating as peers. For example, a given revision made by one peer may be rejected by the other peers for any number of reasons, and the client systems may not sync such rejected revisions to the server systems. This scenario provides an example illustrating a more general principle, under which the client systems and the server systems may maintain distinct models of the data structures they are synchronizing.

Having described the process flows 700 for managing conflict between systems and server systems, the discussion now turns to a description of data storage architectures and related process flows for syncing data from server systems to client systems. This description is now provided with FIG. 8.

Figure 8:
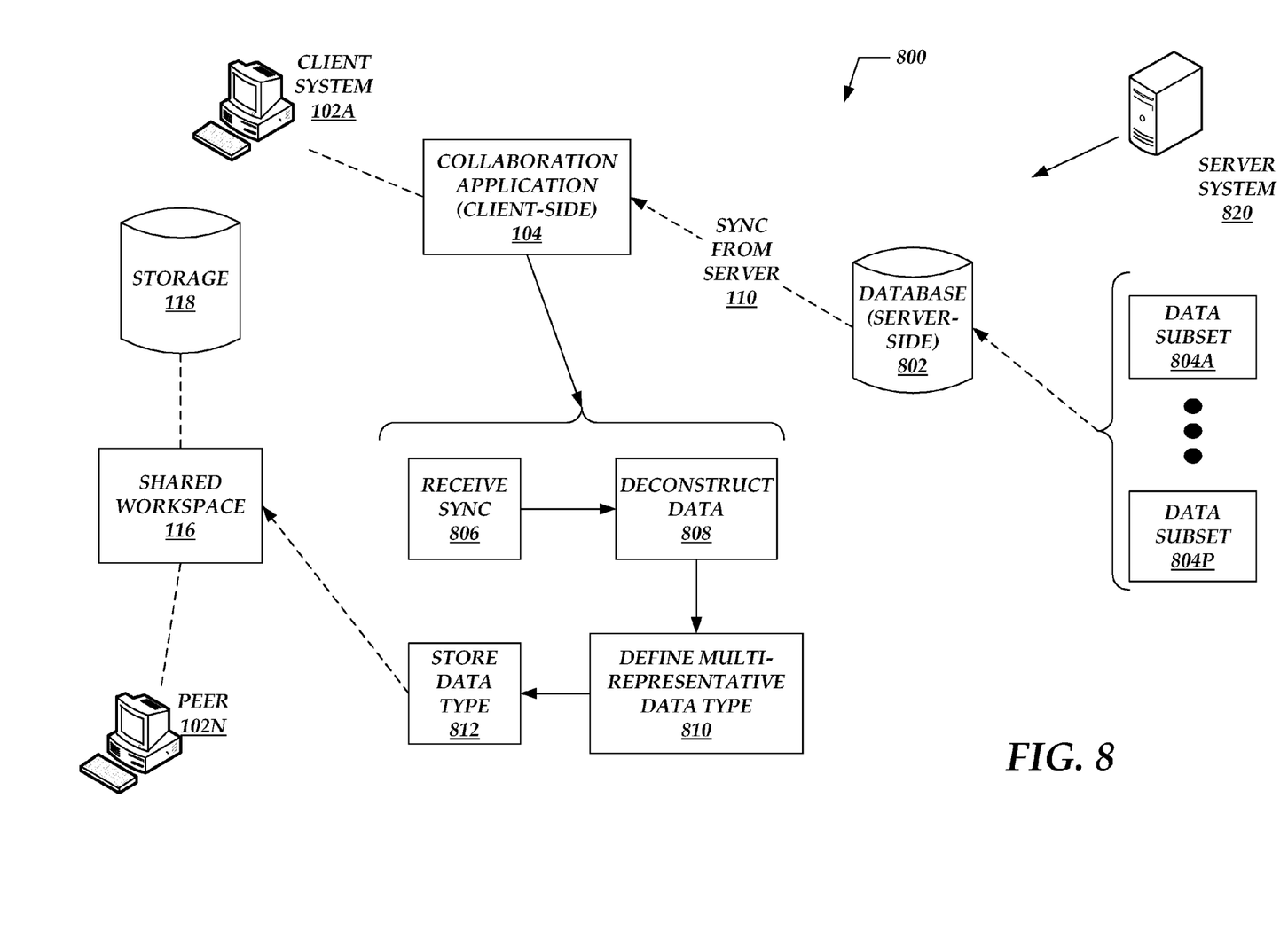
FIG. 8 is a combined block diagram and flow chart, illustrating processes for syncing data from server systems two client systems, operable with data storage architectures.

FIG. 8 illustrates data storage architectures and related process flows, denoted generally at 800, for syncing data from server systems to client systems. For convenience of description, but not to limit possible implementations, FIG. 8 may carry forward some elements from previous drawings, and denote them with identical reference numbers. For example, FIG. 8 carries forward examples of client systems at 102a and 102n (collectively, client systems 102), as well as an example server system at 106.

Turning to FIG. 8 in more detail, the server system 106 may manage one or more server-side databases 802, which may be responsive to run-time queries from various client systems 102 to provide list views to those client systems. In some cases, the server-side databases 802 and its related administration software may not be particularly optimized for run-time performance. For example, as incoming queries arrive from the client systems (e.g., 102a), the server-side database 802 may gather data stored in a variety of different locations within the database to satisfy these queries. FIG. 8 provides two examples of such data as data subsets 804a and 804p (collectively, data subsets 804). Gathering this data from a variety of different locations consumes overhead on the server system 106, and typically this overhead is repeated for various queries arrive from client systems 102.

Turning to the client systems 102, a client-side collaboration application 104 may receive syncs from the server system 106, with FIG. 8 carrying forward an example client server sync at 110. The incoming server sync 110 shown in FIG. 8 may, in some cases, result from queries directed from the client systems 102 to the server systems 106. More specifically, the data contained within the incoming sync 110 may contain at least the data subsets 804 were gathered from various locations within the server-side database 802.

As data arrives on the wire from server systems 106 at various client systems 102 (e.g., 102a), the client systems may initiate instances of the process flows 800. In some cases, these process flows may improve processing of this incoming data within a plurality of client systems 102a and 102n that are collaborating through a shared workspace, carried forward at 116.

Turning to these process flows and more detail, block 806 represents receiving the incoming sync 110, from the server system 106, at a given client system 102a. In turn, block 808 represents deconstructing or decomposing data contained within the incoming sync 110. For example, assuming that the incoming sync contains various data subsets 804, block 808 on the client system may include identifying and separating these various data subsets 804a and 804p. In a relatively simplified example, one data subset 804a may represent a string value transmitted to the client systems, while the data subsets 804p may represent a numeric value (e.g., integer, float, etc.) transmitted to the client systems. In such a case, block 808 may separate and identifies the string value from the numeric value, as concatenated and transmitted together within the incoming sync 110.

In another example, particular data types may represent a "user". The on-the-wire communication received at the client system may represent the "user" data type as, for example, the string "123;#johnsmith@company.com". Within this example string, the numeric prefix may provide an index into a table of users, and the text portion may provide an email address. For convenience on the client side, the client systems may decompose this data type into the following separate fields: the numeric index value as received from the server, the email address, the textual name to be displayed for this user (which may be obtained by a local dereferencing to a client-side copy of the user table), and the like.

Block 810 represents defining one or more strongly-typed, multi-representative data types, which facilitate deconstructing the incoming data from the server systems 106 for more efficient storage and processing within the client systems 102.

Returning to the string-numeric example introduced with block 808, the multi-representative data type may facilitate storing and indexing the string and numeric portions separately. In this scenario, the string and numeric portions may be searched separately, with searches for the strings being optimized separately from any optimizations applied to searching the numeric portions.

In addition to facilitating search, the multi-representative data types may enable indexing within list views. For example, returning to the "user" data type example above, the various fields into which incoming data types are decomposed may be sorted and displayed in order in a list view.

It is also noted that the data transformations described in these examples may be bidirectional. For example, when decomposing the data types incoming from the server into fragments, these fragments may be synchronized across any number of client systems that have peer relationships with one another. If the clients/peers make changes to these fragments, these changes may be synced not only to other peers, but also to one or more server systems. However, before syncing the changes to the servers, the clients/peers may reassemble these changed fragments back into the data types compatible with the server.

Block 812 represents storing the multi-representative data type defined in block 810. More specifically, block 812 may include associating the multi-representative data type with a given shared workspace 116 through which client system 102a and 102n collaborate. In some cases, client-side storage elements (carried forward at 118) may store the multi-representative data types on behalf of the client systems 102 accessing the shared workspace 116.

In this manner, once one of the client systems 102 has queried for particular data subsets 804 from the server system 106, those data subsets may be stored and indexed on the client side within storage elements 118. Thus, any subsequent queries for those same data subsets 804 may be satisfied from the client-side storage 118, rather than directing queries all the way to the server system 106. The client-side storage 118 may be optimized for a particular processing performed through the shared workspace 116. Subsequent queries may be satisfied more efficiently from this optimized client-side storage, as compared to running the same queries on the server system 106. More specifically, result from these queries may be compiled and displayed faster at run-time within the workspace 116, as compared to the server system 106.

Having described the architectures and process flows 800 in FIG. 8, several observations are noted. In some cases, the data types handled within the shared, peer-to-peer workspace (e.g., 116) may be different than the data types handled within the central server 106. Some of these data types may not easily transition between the peer-to-peer workspace and the centralized server. However, the multi-representative data types described in FIG. 8 may facilitate these transitions, by facilitating conversions of string variables received from the server system 106 into different representations as appropriate for the peer-to-peer workspace 116, and vice versa. The multi-representative data types may also facilitate mapping, aliasing, and referencing capabilities within the shared workspace, as well as indexing, collating, and search-related functions.

In addition, the architectures and process flows 800 may enable the client systems to avoid collisions between names used on the server and names used within the workspace. For example, where database implementations within the client systems have internally reserved field names for its own purposes (e.g. "CreatedBy"), the server systems may have a different field with the same name, resulting in a name conflict or collision. In such scenarios, the multi-representative data types may translate between the client and server systems, so as to decouple local naming on the client from external naming on the server, yet translate from the naming on the client to the naming on the server (and vice versa), as appropriate.

Having described the architectures and process flows 800 in FIG. 8, the discussion now proceeds to a description of process flows related to updating application designs in response to design changes synced in from server systems. This description is now provided with FIG. 9.

Figure 9:
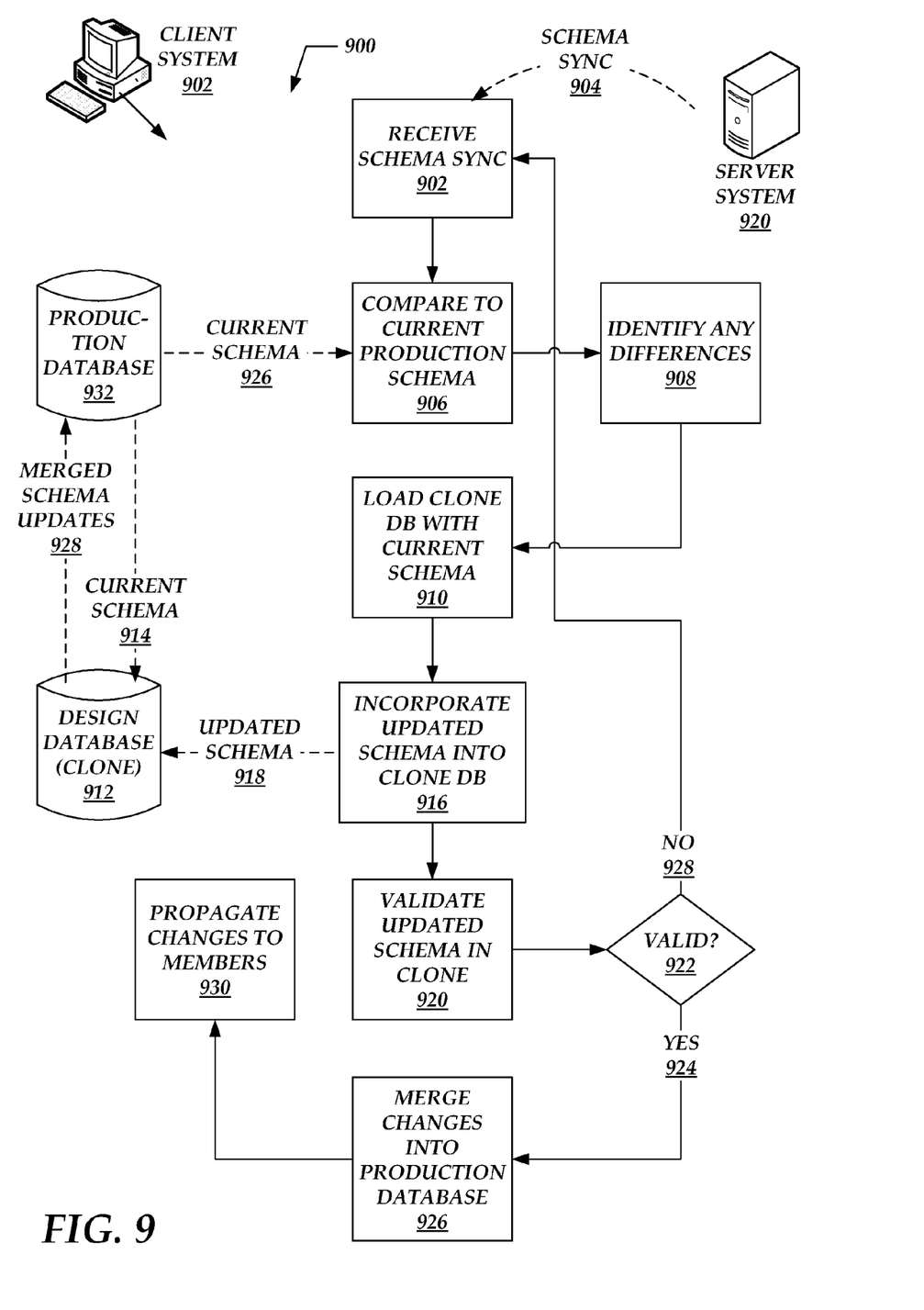
FIG. 9 is a flow chart illustrating processes for updating application designs on the client systems, in response to design changes synced in from server systems.

FIG. 9 illustrates process flows, denoted generally at 900, related to updating application designs on the client systems, in response to design changes synced in from server systems. For convenience of description, but not to limit possible implementations, FIG. 9 may carry forward some elements from previous drawings, and denote them with identical reference numbers. For example, FIG. 9 carries forward examples of client systems at 102, as well as an example server system at 106. Although the process flows 900 are described in connection with these client and server systems, it is noted that implementations of these process flows may be performed on other components, without departing from the scope and spirit of this description.

Turning to the process flows 900 in more detail, block 902 represents the client system 102 receiving a sync from the server system 106. More specifically, block 902 may include receiving a sync 904 from the server that updates a schema used to populate a production database maintained by the client system 102. FIG. 9 carries forward an example production database at 306, an example schema 304, and an example tool or application 312, which is instantiated from the production database.

Block 906 represents comparing the schema as received in the sync 904 to the production schema 304 currently used to instantiate the production database 306. In turn, block 908 may include identifying any differences between the current production schema 304 and the schema represented by the incoming sync 904.

Block 910 represents creating a clone of the current production database to be used for validating the incoming schema changes, as well as loading the clone database with the current schema. FIG. 9 provides an example of the clone database at 912, and represents loading the current schema into this database at 914.

Block 916 represents incorporating the updated schema into the clone database 912, thereby updating the clone database with the updated schema as received from the server system. FIG. 9 represents the updated schema or schema changes at 918, as copied to the clone database 912. In this manner, block 916 may take the current schema 914 as a starting point, and then update the schema with the schema changes 918 arriving from the server system 106.

Block 920 represents validating the updated schema in the clone database. In general, block 920 may include instantiating or building a tool or application within the clone database, and evaluating the results. In turn, decision block 922 represents determining whether the updated schema was validated within the clone database. If the updated schema was valid within the clone database, the process flows 900 may take Yes branch 924 to block 926, which represents merging the schema changes into the production database 306 on the client system 102. FIG. 9 represents these merged schema updates at 928.

Block 930 represents propagating the schema changes and/or the updated production database to other client systems collaborating within a given shared workspace (e.g., 116 in previous drawings). In this manner, all client systems 102 collaborating within the shared workspace may operate from a common production database 306.

Returning to decision block 922, if the updated schema was not valid within the clone database, the process flows 900 may take No branch 932 to return to block 902. The process flows may remain in block 902, awaiting receipt of the next schema sync from the server system 106. In effect, taking No branch 932 enables the process flows 900 to not assimilate any invalid schema syncs into the production database 306.

Having described the process flows 900 in FIG. 9, several observations are now noted. The process flows 900 may provide the client systems 102 with a dynamic reconfiguration capability, by which the client systems 102 may update production databases (as well as related UI elements, tools or applications, and other elements) in response to schema changes synced-in from the server systems. In addition, this dynamic reconfiguration capability may validate schema changes within a temporary or clone database, before committing schema changes to the live production database.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

In addition, certain process and data flows are represented herein as unidirectional only for the purposes of facilitating this description. However, these unidirectional representations do not exclude or disclaim implementations that incorporate bidirectional flows.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-readable storage medium having computer-executable instructions stored thereon which, when executed by a client system operable with a server system, cause the client system to perform a method comprising:
   providing a production database on the client system, wherein the production database is for instantiating an application related to a workspace shared between the client system and an other client system, wherein the production database is associated with a current schema;
   receiving a synchronization flow from the server system, wherein the synchronization flow includes at least information representing a second schema;
   comparing the current schema to the second schema, as received from the server system;
   creating a clone of the production database thereby forming a clone database;
   loading the current schema into the clone database;
   incorporating the second schema into the clone database; and
   evaluating whether the clone database is valid, as updated with the second schema.

2. The storage medium of claim 1, further comprising instructions for merging the second schema into the production database forming a merged production database, in response to determining that the clone database is valid.

3. The storage medium of claim 2, further comprising instructions for propagating the merged production database to the other client system.

4. The storage medium of claim 1, wherein the current schema is a production schema that is currently used to instantiate the production database.

5. The storage medium of claim 1, further comprising instructions for identifying at least one difference between the current schema and the second schema.

6. The storage medium of claim 1, further comprising instructions for not assimilating the synchronization flow into the production database, in response to determining that the clone database is not valid.

7. The storage medium of claim 6, further comprising instructions for awaiting receipt of another synchronization flow, in response to determining that the clone database is not valid.

8. A computer-implemented method comprising performing computer-implemented operations for:
provided a production database on a client system, wherein the production database is for instantiating an application related to a workspace shared between the client system and an other client system, wherein the production database is associated with a current schema;
receiving a synchronization flow from a server system, wherein the synchronization flow includes at least information representing a second schema;
comparing the current schema to the second schema, as received from the server system;
creating a clone of the production database thereby forming a clone database;
loading the current schema into the clone database;
incorporating the second schema into the clone database; and
evaluating whether the clone database is valid, as updated with the second schema.

9. The computer-implemented method of claim 8, further comprising merging the second schema into the production database forming a merged production database, in response to determining that the clone database is valid.

10. The computer-implemented method of claim 9, further comprising propagating the merged production database to the other client system.

11. The computer-implemented method of claim 8, wherein the current schema is a production schema that is currently used to instantiate the production database.

12. The computer-implemented method of claim 8, further comprising identifying at least one difference between the current schema and the second schema.

13. The computer-implemented method of claim 8, further comprising not assimilating the synchronization flow into the production database, in response to determining that the clone database is not valid.

14. The computer-implemented method of claim 13, further comprising awaiting receipt of another synchronization flow, in response to determining that the clone database is not valid.

15. A client system comprising:
a processor; and
a computer-readable storage medium operably connected to the processor, the computer-readable storage medium having computer-executable instructions stored thereon which, when executed by the processor, cause the processor to:
provide a production database, wherein the production database is for instantiating an application related to a workspace shared between the client system and an other client system, wherein the production database is associated with a current schema;
receive a synchronization flow from a server system, wherein the synchronization flow includes at least information representing a second schema;
compare the current schema to the second schema, as received from the server system;
create a clone of the production database thereby forming a clone database;
load the current schema into the clone database;
incorporate the second schema into the clone database; and
evaluate whether the clone database is valid, as updated with the second schema.

16. The client system of claim 15, wherein the computer-readable storage medium has further computer-executable instructions stored thereon which, when executed by the processor, cause the processor to merge the second schema into the production database forming a merged production database, in response to determining that the clone database is valid.

17. The client system of claim 16, wherein the computer-readable storage medium has further computer-executable instructions stored thereon which, when executed by the processor, cause the processor to propagate the merged production database to the other client system.

18. The client system of claim 15, wherein the computer-readable storage medium has further computer-executable instructions stored thereon which, when executed by the processor, cause the processor to identify at least one difference between the current schema and the second schema.

19. The client system of claim 15, wherein the computer-readable storage medium has further computer-executable instructions stored thereon which, when executed by the processor, cause the processor to not assimilate the synchronization flow into the production database, in response to determining that the clone database is not valid.

20. The client system of claim 19, wherein the computer-readable storage medium has further computer-executable instructions stored thereon which, when executed by the processor, cause the processor to await receipt of another synchronization flow, in response to determining that the clone database is not valid.

* * * * *